3,231,467
METHOD OF TREATING COCCIDIOSIS
John Martin Clegg, Upper Montclair, N.J., assignor to S. B. Penick & Company, New York, N.Y., a corporation of Delaware
No Drawing. Filed Aug. 1, 1962, Ser. No. 213,857
6 Claims. (Cl. 167—53.1)

This invention relates to treatments for the control and mitigation of coccidiosis, a disease which infects poultry, and more particularly it is concerned with dichlorobenzamides as coccidiostats and compositions containing such dichlorobenzamides for prophylactic and therapeutic purposes.

Coccidiosis is a widely prevalent problem in the raising of poultry. It is a protozoan infection attacking the digestive tract and is particularly toxic to young poultry between the ages of 2 to 14 weeks. The disease is characterized by intestinal disorder, hemorrhage, cecal congestion, etc., which causes extensive destruction of poultry flocks and substantial economic losses.

It is caused by several species of protozoan parasites of the genus, Eimeria, such as E. tenella, the E. necatrix, E. acervulina, E. maxima, E. hagani, and E. brunetti. E. tenella is the causative agent of acute cecal coccidiosis which is a severe and often fatal infection of the ceca of the chickens. Manifestations of acute cecal coccidiosis are severe and extensive hemorrhage, accumulation of blood in the ceca and passage of blood in the droppings. In untreated birds the mortality may run as high as 95%. In addition, survivors of infections are characterized by poor weight gain, poor conformation and reduced feed-efficiency.

E. necatrix and the other species of coccidia primarily cause the intestinal type of coccidiosis. This may be of either the acute or chronic type; the former often causing death from 5 to 7 days after infection and later resulting in a lingering illness.

Chicks heavily infected with cecal or intestinal coccidiosis become droopy, look unthrifty, usually have ruffled feathers and pale beaks and shanks. They eventually become so emaciated that death follows. The mortality in a flock is high and may occur very suddenly. A farmer's entire investment may be lost in a matter of 2 to 3 weeks. Older birds that have become immune to the disease are a constant source of reinfection as is a previously infested range.

This invention is based on the discovery that dichlorobenzamides having the formula:

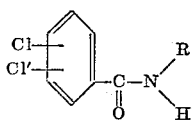

where Cl and Cl' may be on any of the positions on the benzene ring; and R is hydrogen or lower alkyl alkenyl, and alkynyl; when administered by the oral route admixed with the normal nutriments are effective in the control of coccidiosis in poultry. The compositions consisting of these dichlorobenzamides admixed in the normal poultry ration have been found effective in the treatment of established infections of coccidiosis as well as in the prevention of such infections.

These coccidiostatic compounds are conveniently fed to poultry as a component of the "starter" mash and in the solid feedstuffs given to the more mature birds. They may also be administered dissolved or suspended in the drinking water. It is generally convenient and preferred to add these dichlorobenzamides to the poultry feed so that a therapeutic dosage is ingested with the daily food ration.

The benzamides may be added directly to the feed as such or in the form of a premix or concentrate. A premix or concentrate of the therapeutic agent in a carrier is commonly employed to facilitate a uniform dispersion of the therapeutic agent in the feed. Suitable carriers for the premix or concentrate are liquids, such as water, oils, fats, or solids such as various meals, for example, soybean meal, cornmeal, cottonseed oil meal, sunflower seed meal, linseed oil meal, corncob meal, or mineral grit, ground oyster shells, all such as commonly employed in poultry nutriments. A particularly effective premix carrier is a small portion of the poultry feed itself. In addition to the abovementioned solids, the dichlorobenzamides may be dispersed or dissolved in oily vehicles such as soybean oil, corn oil, cottonseed oil and the like, which are normally added to reinforce poultry mixes and this material is then blended with the poultry ration.

The high potency concentrates are blended by the feed manufacturer with other feed components in the usual manner. The mixtures are thoroughly blended and the finished feed should contain up to 80% of grains, up to 30 of proteins, and 2 to 4% of minerals. Supplemental vitamins, growth factors, and antibiotics may also be added as is the current practice.

The proportions of active material in the concentrate are capable of wide variations since the amount in the finished feed may be adjusted by blending appropriate portions of the premix with the feed to obtain a desired level of therapeutic agent.

For the prevention and treatment of coccidiosis the therapeutic compounds, i.e., the dichlorobenzamides are employed at low levels in feeds. Depending upon the conditions of exposure, prevalence of the disease and severity of the epidemic; various proportions of the active compounds are incorporated into the nutritionally balanced feed as described above. Feed compositions containing as little as 0.005% by weight of the more active dichlorobenzamides will provide prophylactic control for light infections. Concentrations as high as 0.1% by weight may be employed for short-term intensive therapy. In general it is preferred to feed the active compound at concentrations ranging from 0.01 to 0.05% by weight of the total feed mixture. Representative feed mixture formulae suitable for these purposes are to be found in the Feed Trade Manual, published by the National Provisioner Incorporated; pages 65 through 120 of the 1961 edition contain a collection of poultry feed formulae.

It has been found that the feeding of the preferred compounds in poultry mixes at the concentrations where the animal ingests from 100 milligrams to 500 milligrams of these dichlorobenzamides per kilo of diet will assure freedom from coccidiosis-induced mortality or debilitation. These compounds at these levels control coccidial infections caused by E. tenella as well as those caused by the other Eimeria species. The dichlorobenzamides of this invention may be prepared according to procedures set forth in the representative examples appended below.

*Example 1.—3,5-dichlorobenzamide*

Prepare 3,5-dichlorobenzoyl chloride by reacting 3,5-dichlorobenzoic acid with an excess of thionyl chloride. Remove the thionyl chloride and purify the acid chloride by distillation. React the 3,5-dichlorobenzoyl chloride with an excess of ammonia (aqueous) to yield a crude 3,5-dichlorobenzamide. Purify by recrystallization, M.P. 161–161.5° centigrade [see also Ber., 90, pages 19–28 (1957)].

Example 2.—2,3-dichlorobenzamide

Mix 2,3-dichloroaniline with an excess of hydrochloric acid and sufficient ice to cool the mixture to approximately 0° centigrade. To this suspension slowly add with stirring sodium nitrite dissolved in water. Keep the reaction mixture cool (below 10° centigrade). Continue the addition of the sodium nitrite until the mixture shows a permanent reaction for free nitrous acid (starch-iodide test paper). Neutralize the acidity of the mixture to a litmus end-point with dry sodium carbonate.

Prepare a fresh solution of copper cyanide by reacting copper chloride with sodium cyanide. Cool this solution to about 0° centigrade and cover the surface with a layer of benzene. To this solution slowly add the neutralized diazonium salt. Stir vigorously and keep the reaction mixture cold. Upon completion of the addition, allow the reaction to continue in the cold for an additional 30 minutes and then allow the mixture to warm to ambient temperatures. Then slowly heat the mixture to 50° centigrade without stirring (to remove dissolved gases). Allow to cool. Separate the two layers. Reserve the benzene layer and extract the aqueous residue with two portions of benzene. Steam distill the aqueous layer and extract the distillate with benzene. Combine the benzene fractions, dry, and distill off the benzene. Recrystallize the residue from petroleum ether (60–90°) and collect the needles of 2,3-dichlorobenzonitrile (M.P. 54–56° centigrade). This compound is novel.

Hydrolyze the 2,3-dichlorobenzonitrile with potassium hydroxide in the presence of methanol and water by refluxing for a few hours. Cool the reaction mixture and harvest the crystals of 2,3-dichlorobenzamide. Recrystallize. The melting point is 161–164° centigrade. This compound is novel.

Example 3.—2,6-dichlorobenzamide

Use the procedure of Example 2 above by starting with 2,6-dichlorobenzonitrile to prepare 2,6-dichlorobenzamide. This material melts at 200–202° centigrade, Reich., Bull. Soc. Chim. (4) 21, 223, in Beilstein, vol. 9, First Supp., page 141.

Example 4.—2,4-dichlorobenzamide

Use the procedure of Example 1 (second paragraph) but start with 2,4-dichlorobenzoyl chloride to prepare the 2,4-dichlorobenzamide. Melting point 181–182° centigrade. [A. D. Kirsanov and R. T. Makitra, Zhur Obshchei Khim. 26, page 907–914 (1956).]

Example 5.—2,5-dichlorobenzamide

Use the procedure of Example 1 second paragraph but start with 2,5-dichlorobenzoyl chloride to prepare the 2,5-dichlorobenzamide. This material when recrystallized from water has a melting point of 155° centigrade (Beilstein, Ann., 179, 290; in Beilstein, vol. 9, 343).

Example 6.—3,4-dichlorobenzamide

Use the procedure of Example 1 second paragraph but start with 3,4-dichlorobenzoyl chloride to prepare the 3,4-dichlorobenzamide. Melting point 133° centigrade. (Khuhlberg, Ann., 152, 288; in Beilstein, vol. 9, page 344).

Example 7.—3,4-dichloro-N-methylbenzamide

Add 3,4-dichloro-N-methylbenzamide in small portions with continuous agitation to an excess of a 40% methylamine solution. Allow the white solid which separates to precipitate. Filter the precipitate, wash with cold water and then dry it. This 3,4-dichloro-N-methylbenzamide is recrystallized from ethyl acetate and melts at 133–134° centigrade. [J. Am. Chem. Soc., 81, 3728 (1959).]

Example 8.—2,5-dichloro-N-methylbenzamide

Use the procedure of Example 7 but substitute 2,5-dichlorobenzoyl chloride for the 3,4-dichlorobenzoyl chloride of the example. The 2,5-dichloro-N-methylbenzamide melts at 115–116.5° centigrade.

Example 9.—2,5-dichloro-N-ethylbenzamide

Use the procedure according to Examples 7 and 8 but substitute ethylamine for the methylamine solution in Example 7. The 2,5-dichloro-N-ethylbenzamide melts at 89.5–99.5° centigrade.

Example 10.—3,4-dichloro-N-ethylbenzamide

Use the procedure of Example 7 but substitute ethylamine solution for the methylamine solution of Example 7. The 3,4-dichloro-N-ethylbenzamide melts at 98–99.5° centigrade. The lower N-alkyldichlorobenzamides may be prepared in a similar manner using the appropriate alkylamine and substituted benzoyl chloride.

The anticoccidial activity is pronounced in all the dichlorobenzamides including those bearing one lower-alkyl, -alkenyl or -alkynyl substituents having five carbon atoms or less on the amide nitrogen. The intensity of the anticoccidial effect varies and in the case of the 2,4-dichlorobenzamide and 3,5-dichlorobenzamide it is lower than in the case of the other dichlorobenzamide isomers. These two isomers, the 2,4-dichlorobenzamide and the 3,5-dichlorobenzamide, appear to be distasteful to chickens and repel them from their feed. Because of repulsion, the feed intake is low and the anticoccidial intake of these compounds is minimal. Such repulsion can be overcome by masking agents and/or attractants.

Specific compounds within the scope of this invention include:

2,3-dichlorobenzamide
2,4-dichlorobenzamide
2,5-dichlorobenzamide
2,6-dichlorobenzamide
3,4-dichlorobenzamide
3,5-dichlorobenzamide as well as the respective:

Dichloro-N-methylbenzamides
Dichloro-N-ethylbenzamides
Dichloro-N-propylbenzamides
Dichloro-N-butylbenzamides and Dichloro-N-allylbenzamides
Dichloro-N-propargylbenzamides and complexes thereof.

The dichlorobenzamide moiety of this invention appears to be highly specific. In contrast to the dichlorobenzamides, the monochlorobenzamides and the trichlorobenzamides possess virtually no anticoccidial activity. Further, extending the carbon chain of the N-alkyl substituents beyond five carbons also appears to eliminate the anticoccidial activity. Other postulated anticoccidial substituents on the benzene ring such as nitro, in addition to the two chlorine atoms, appear to interfere with the anticoccidial effect. For example, 3-nitro-2,5-dichlorobenzamide as well as 3-nitro-2,5-dichloro-N-ethylbenzamide had no protective effect against coccidiosis infection in chicks, whereas the 2,5-dichlorobenzamide was one of the more effective compounds.

Similarly, the 2,4-dichloro-3,5-dinitrobenzamide did not protect the chickens from coccidiosie, although 3,5-dinitrobenzamide has anticoccidial activity according to U.S. Patent 3,015,606, issued on January 2, 1962.

In general, the concentration of the active compounds in the medicated feed rations should be more than 100 parts per million of ration. Depending on the age of the chicks to which it is administered, and their body weight, this corresponds to a daily drug intake of from 5 milligrams/kilogram to as much as 20 milligrams/kilogram of body weight. This is based on the assumption that the average chick will ingest up to an equivalent of about 15% of its body weight as its daily food ration. As the chick matures into a chicken the ratio of food intake to body-weight decreases and the level of 5 milligrams/kilogram of body weight of drug is achieved. Of course, the medication may be administered at higher levels of medication. Such higher concentrations (up to as much as 1% by weight of feed) may be administered as a single daily ration if there is evidence of widespread infection in the poultry flock. Such a concentration would yield a medication concentration of 1.25 to 1.5 grams of medication per kilogram of body weight in the case of the average chick just transferred from starter mash to regular feeds. Such chicks are usually about two weeks old.

Occasionally when it is desired to administer the medication in the water ration, the medication can be dispersed or emulsified through the drinking water supply for the poultry flock. The medication can be formulated with non-toxic solvents, oils and sufficient surfactants to assure even dispersion in the water supply and in concentrations sufficient to provide adequate dosage of the active ingredients.

Representative dichlorobenzamides have been administered to mammalian species and particularly to mice in an attempt to ascertain the $LD_{50}$ of such compounds. The mice survived dosages ranging as high a 1 gram of 2,4-dichlorobenzamide and 2,5-dichlorobenzamide per kilogram. This demonstrates the lack of toxicity of the compounds and their class and indicates that the materials, when administered to chickens, will present little problem of toxic tissue-residues when the poultry is ready for market.

The compounds of this invention were administered to two week old Cornish-Rock chicks. The results for the preferred compounds are reported in Table 1.

parative scores based on the observed symptoms of cecal coccidiosis.

The cecal score is a numerical rating based on the physical findings of the cecum on post mortem and is as follows:

1.8—No lesions and a functional cecum (1.8 grams is the parison with inoculated unmedicated birds.
2.0—Cecum not functioning, mild lesions, reduced in length.
2
↓
4—These scores are based on the average weight per cecum on post mortem. The score of 4 is also assigned to all birds that die of cecal coccidiosis. Similarly it is the maximum for badly infected birds, indicating complete congestion in the cecum.

The blood score is similarly based on a qualitative comparison with inocculated unmedicated birds.

0—No blood in the pen-droppings.
1—Significant traces of blood in pen-droppings.
2
↓
5—Relative scores with 5 indicating extensive hemorrhaging and complete lack of control of the parasite. (4 is the average score for inoculated birds showing an uncontrolled infection with moderate hemorrhaging.)

While the invention has been illustrated by the foregoing examples of active materials, it will be apparent that various equivalent changes and modifications may be resorted to in carrying out this invention without departing from the scope and spirit thereof, and it will be understood that such equivalent embodiments are all within the purview of the annexed claims.

I claim:
1. The method of combating coccidiosis in poultry hus-

TABLE I

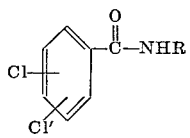

| Position | | R | Drug, p.p.m. | Percent gain | | Percent Deaths | | Cecal Score | | Blood score | |
|---|---|---|---|---|---|---|---|---|---|---|---|
| Cl | Cl' | | | Medicated | Control | Medicated | Control | Medicated | Control | Medicated | Control |
| 2 | 3 | H | 250 | 69 | 45 | 0 | 30 | 1.8 | 4.0 | 1 | 4 |
| 2 | 5 | H | 250 | 55 | 47 | 0 | 60 | 1.8 | 4.0 | 2 | 5 |
| 3 | 4 | H | 250 | 54 | 37 | 0 | 70 | 2.0 | 4.0 | 0 | 4 |
| 3 | 4 | CH₃ | 250 | 70 | 45 | 0 | 30 | 1.8 | 3.0 | 2 | 5 |
| 3 | 4 | C₂H₅ | 250 | 35 | 36 | 40 | 80 | 2.7 | 4+ | 2 | 4 |
| 2 | 6 | H | 250 | 36 | 45 | 0 | 30 | 1.8 | 3.0 | 1 | 4 |

All birds inoculated with 50,000 oocysts of *E. tenella* three days after beginning (start) of administration of the drug. Uninoculated, unmedicated control birds had a weight gain of 70-80% during the experimental period.

The chicks were maintained on the medicated feed (starter-mash) and the weight gain ascertained after four days. This provides a measure of the palatability or toxicity of the medication to uninfected birds. The chicks were orally inoculated on the fourth day with 50,000 sporulated *E. tenella* oocysts. Surviving chicks were weighed, sacrificed, and pathologically examined on the seventh day after inoculation. Dead birds were weighed and posted on the day of death.

The percentage weight gains exhibited by the survivors as compared to unmedicated inoculated controls is one measure of the anticoccidial activity. (Uninoculated controls exhibit a weight gain of 70%–80%). Other measures of anticoccidial activity are the percentage of survivors and the cecal and blood scores. The percentage of survivors after inoculation is a self-evident measure of anticoccidial effect. The cecal and blood scores are combandry which comprises the method of orally administering to poultry, a compound selected from the group consisting of dichlorobenzamide, dichloro-N-lower-alkyl, dichloro-N-lower-alkynyl, and dichloro-N-lower alkenyl-substituted benzamide, said compound being administered in a daily amount within the range of approximately five milligrams to 1000 milligrams/kilograms of body weight of the poultry.

2. The method of combating coccidiosis in poultry which comprises feeding to poultry, rations supplying an effective amount of a compound selected from the group consisting of dichlorobenzamide, dichloro-N-lower alkenyl, dichloro-N-lower-alkynyl, and dichloro-N-lower-alkyl substituted benzamide, to combat coccidial infections.

3. The method according to claim 2 wherein the dichlorobenzamide is 2,5-dichlorobenzamide.

4. The method according to claim 2 wherein the dichlorobenzamide is 2,6-dichlorobenzamide.
5. The method according to claim 2 wherein the dichlorobenzamide is 3,4-dichlorobenzamide.
6. The method according to claim 2 wherein the dichlorobenzamide is 2,3-dichlorobenzamide.

References Cited by the Examiner
UNITED STATES PATENTS
2,551,891  5/1951  Martin _____ 260—558

OTHER REFERENCES
Miller, Encyclopedia of Animal Care, sixth edition, 1962, Williams and Wilkins Co., pages 599, 855 and 856.

JULIAN S. LEVITT, *Primary Examiner*.
FRANK CACCIAPAGLIA, JR., LEWIS GOTTS,
*Examiners.*